United States Patent
Achten et al.

(10) Patent No.: US 10,412,873 B2
(45) Date of Patent: Sep. 17, 2019

(54) SOIL CULTIVATION IMPLEMENT HAVING A DEVICE FOR RECONSOLIDATION

(71) Applicant: LEMKEN GmbH & Co. KG, Alpen (DE)

(72) Inventors: Georg Achten, Tönisvorst (DE); Johannes Bodewig, Meerbusch (DE); Clemens Diepers, Aldekerk (DE); Josef Van Haaren, Kalkar (DE); Christoph Happe, Alpen (DE); Sebastian Karsten, Xanten (DE); Ludger Maas, Sonsbeck (DE); Georg Paulessen, Viersen (DE)

(73) Assignee: LEMKEN GmbH & Co. KG, Alpen (DE)

( * ) Notice: Subject to any disclaimer, the term of this patent is extended or adjusted under 35 U.S.C. 154(b) by 207 days.

(21) Appl. No.: 14/909,237

(22) PCT Filed: Jul. 15, 2014

(86) PCT No.: PCT/DE2014/100256
§ 371 (c)(1),
(2) Date: Feb. 1, 2016

(87) PCT Pub. No.: WO2015/014345
PCT Pub. Date: Feb. 5, 2015

(65) Prior Publication Data
US 2016/0183446 A1 Jun. 30, 2016

(30) Foreign Application Priority Data
Jul. 31, 2013 (DE) ........................ 10 2013 108 229

(51) Int. Cl.
*A01B 49/02* (2006.01)
*A01B 63/22* (2006.01)
(Continued)

(52) U.S. Cl.
CPC ............ *A01B 49/027* (2013.01); *A01B 49/02* (2013.01); *A01B 63/145* (2013.01); *A01B 63/22* (2013.01); *A01B 63/32* (2013.01)

(58) Field of Classification Search
CPC .. A01B 63/112; A01B 63/114; A01B 63/1115
(Continued)

(56) References Cited

U.S. PATENT DOCUMENTS 2,261,666 A * 11/1941 Selhorst ............... A01B 49/027
172/142
4,187,914 A * 2/1980 van der Lely ......... A01B 11/00
172/102
(Continued)

FOREIGN PATENT DOCUMENTS

DE 102007011297 A1 9/2007
DE 102008032592 A1 1/2010
(Continued)

Primary Examiner — Thomas B Will
Assistant Examiner — Joel F. Mitchell
(74) Attorney, Agent, or Firm — James Creighton Wray; Meera P. Narasimhan

(57) ABSTRACT

A towed soil cultivation implement (1) is proposed in which the soil tillage tools (5) are guided by a contact pressure controlled depth guide device (9), which enables a constant weight load on a downstream, adjustable reconsolidation implement (6) on uneven ground as well. In the process, the pull line between tractor (3) and soil cultivation implement (1) are maintained in an optimum position.

14 Claims, 2 Drawing Sheets

(51) Int. Cl.
*A01B 63/32* (2006.01)
*A01B 63/14* (2006.01)

(58) Field of Classification Search
USPC ......................................... 172/4, 8
See application file for complete search history.

(56) References Cited

U.S. PATENT DOCUMENTS

| | | | | |
|---|---|---|---|---|
| 4,600,060 | A * | 7/1986 | Winter et al. ......... | A01B 63/32 172/4 |
| 6,076,611 | A * | 6/2000 | Rozendaal et al. .... | A01B 63/22 172/2 |
| 6,460,623 | B1 * | 10/2002 | Knussman et al. .... | A01B 63/11 111/926 |
| 8,448,717 | B2 * | 5/2013 | Adams et al. ......... | A01C 7/203 111/135 |
| 8,573,319 | B1 * | 11/2013 | Casper et al. ....... | A01B 63/112 172/4 |
| 2013/0341056 | A1 * | 12/2013 | Casper et al. ....... | A01B 63/111 172/4 |
| 2015/0156962 | A1 * | 6/2015 | Zemenchik et al. ......... | A01B 79/005 172/1 |

FOREIGN PATENT DOCUMENTS

| | | |
|---|---|---|
| DE | 202011107598 U1 | 1/2012 |
| DE | 102011050195 A1 | 11/2012 |
| FR | 2946831 A1 | 12/2010 |
| WO | 0195698 A1 | 12/2001 |
| WO | WO-2012060770 A1 * 5/2012 ........... A01B 29/041 |
| WO | 2013030183 A1 | 3/2013 |

* cited by examiner

SOIL CULTIVATION IMPLEMENT HAVING A DEVICE FOR RECONSOLIDATION

This application claims the benefit of German Application No. 10 2013 108 229.7 filed Jul. 31, 2013 and PCT/DE2014/100256 filed Jul. 15, 2014, International Publication No. WO 2015/014345 A1, which are hereby incorporated by reference in their entirety as if fully set forth herein.

The invention refers to a towed soil cultivation implement in accordance with the characterising clause of patent claim 1.

Towed soil cultivation implements usually have a large working width and therefore a large number of soil tillage tools arranged in parallel and one after the other that are combined in a section and serve to cut or tear open the ground and loosen the soil and to mix it with harvest residues. In addition, with this range of tools there is usually a reconsolidation device arranged downstream that partly reconsolidates the loosened and comminuted soil in order to enable a capillary supply of water for the seedlings in the subsequent sowing. Because these wide soil cultivation implements require very high traction, the towing tractor reaches its slip limit, that is, the drive wheels spin and are unable to transmit additional traction. One approach to a solution for this problem is pursued by the German patent DE10 2011 050 195 B4 and the German utility model document DE 20 2011 107 598 U1, in that they transmit part of the implement's weight to the tractor's towbar with a movable drawbar and hydraulic cylinders that act on this in a controlled and traction-increasing manner. However, with this design the pull line, which runs between the contact points of the soil tillage tools and the tractor's towing hitch, changes constantly, in particular on uneven ground. Here, it is difficult to realise stable depth guidance of the soil tillage tools in spite of the depth guidance wheels situated in front of the implements. Because of the changing pull line, the load pressure on the tractor's towing hitch has to be constantly readjusted because of the predominant force correlations. Another path is taken by the German application document DE 10 2008 032 592 A1, in that the draw gear is connected with the tractor's three-point hydraulic system and though an additional energy accumulator transmits both the weight of the implements and part of the front axle load onto the tractor's rear axle efficiently, thus improving traction. Through the rigid arrangement of the draw gear, a constant run of the pull line is achieved from the contact points of the soil tillage tools to the tractor's suspension point. However, in uneven ground the working depth of the soil tillage tools can deviate from the setpoint value. The consequence is soil that is only partly tilled or traction required for the soil cultivation implement that exceeds the tractor's traction capacity. A towed sowing coulter arrangement is described in a further application DE 10 2007 011 297 A1, in which one or two double disc coulters are supported by a carrying wheel, on the arm of which further pressure rollers with adjustable contact pressure that close the seed furrows are flexibly mounted.

Starting from the state of the art, the task of the invention is to eliminate the above disadvantages and to provide a steadily regulated depth guide for a towed soil cultivation implement.

The task is solved through the features of the characterising part of claim 1.

The working depth of the soil tillage tools is given though depth guide devices whose contact pressure on the ground is controlled or regulated by a controller, so that a large part of the implement's weight can bear down on the reconsolidation device and support it in its effect, and an additional part of the implement's weight can bear down on the tractor's rear axle through the draw gear. If the contact pressure of the depth guide device increases or is reduced, the height setting of the reconsolidation device to the soil tillage tools is readjusted by the controller through adjusting devices. With a given weight of the implement, this results advantageously in a constant distribution of the implement's weight between draw gear, depth guide device and reconsolidation device.

In a special embodiment, the minimum distance of the depth guide device from one of the soil tillage tools is less than the minimum distance of the section of the soil tillage tools from the reconsolidation device. In this way, a wide height adjustment range of the reconsolidation unit is achieved with, at the same time, high control precision with low travel ranges of the adjusting devices.

In a further form of the invention, the contact pressure of the depth guide device on the ground can be preselected or is adjustable as a control variable in stages or continuously. By preselecting the contact pressure that is to be regulated, it is possible to react simply to different soil qualities and to improve the control quality of the contact pressure still further. Preselecting the contact pressure that is to be regulated can be done not only directly at the controller but also through an additional input device on the tractor that communicates with the controller.

In a preferred form of the invention, the contact pressure of the depth guide device on the ground is determined with measuring instruments on the depth guide device. The measuring instruments are connected to the controller. Through direct assignment of a measuring device such as loadpins or strain gauges to the depth guide device the actual load pressure or the actual contact pressure is determined directly or through familiar lever ratios in a simply manner. It is also possible to fix the depth guide device partly sprung. The load pressure or the contact pressure can be calculated through the determination of the spring deflection of the mounting or the springs with, for example, a displacement transducer with known spring rate. The depth guide device can also be adjusted in its vertical distance to the soil tillage tools or to the frame by adjusting devices. The required actuating force of the adjusting devices or, for example, the hydraulic signal pressure, is then determined with sensors and can be applied for the calculation of the load pressure or the contact pressure by the controller.

In a favourable implementation of the invention, the actuating forces of the adjusting devices for adjusting the height of the reconsolidation device are recorded by the controller and used to control the contact pressure of the depth guide device. Through the determination of the actuating forces of the adjusting devices for adjusting the height of the reconsolidation device, the contact pressure of the depth guide devices can be calculated by the controller with known or measured geometry conditions and frame dimensions and preset as a control variable.

In another implementation of the soil cultivation implement, additional adjusting devices are provided for setting the frame in an operating position, whose determined actuating forces are indicative of the contact pressure of the depth guide device and can be used for the control of this pressure through the controller.

It is also conceivable for the controller to be designed as a three-point controller. Through this implementation, digital commands can be sent simply by the controller to the actuators and positioning elements. In particular, hydraulic black-white control valves and hydraulic or pneumatic adjusting cylinders have been thought of here as adjusting devices. Likewise, the installation of an electric spindle actuator is possible, for example.

In a preferred form of the invention, the controller is designed to act on the tractor's control or positioning elements. For example, through activation of a tractor's hydraulic control valves that are connected to the adjusting devices of the soil cultivation implement, the expense of additional control valves, for example, on the soil cultivation implement can be saved cost-effectively. Communication of the controller with the tractor's control and positioning elements takes place on an electrically analogue or digital path, with a data bus system or wirelessly by radio, for example.

In another embodiment of the invention, the depth guide devices are arranged sideways to the section of the soil tillage tools. High precision of the depth guide is achieved through the arrangement sideways to the field of the soil tillage tool.

In a preferred form of the invention, the section of the soil tillage tools is designed at least in the front rows in a trapezoidal distribution of the soil tillage tools. The imaginary trapezoidal boundary surrounding the soil tillage tools creates a free space in which the depth guide device can be arranged sideways to the first row of the tools and to the frame in front of the outermost tool of the following tool rows. In this way, the precision of the depth guide is increased again considerably. In addition, the whole surface of the ground up to the field boundary can be tilled, without the depth guide device projecting beyond this section and, for example, colliding with obstacles. In addition, through the trapezoidal distribution of the soil tillage tools the implement is guided at the side better in the rut and stabilised.

In an extended form of the invention, at least one additional adjusting device is assigned to the draw gear to transfer part of the weight of the soil cultivation implement to the tractor. In this way, the weight distribution between tractor and reconsolidation unit can be varied flexibly. Because the contact pressure of the depth guide device is still controlled, the weight distribution that is changed by the additional adjusting device between tractor and soil cultivation implement is held constant. In particular, the weight transmission onto the tractor by means of traction enhancement as an adjusting device that works together with the tractor's three-point hydraulic system does not have a negative impact on the control quality of the depth guide device's contact pressure.

A further proposal provides that a preferably height-adjustable transport chassis is assigned to the soil cultivation implement. This implementation facilitates transport of the soil cultivation implement by road. An arrangement of the chassis between the section of the soil tillage tools and the reconsolidation device achieves particularly good manoeuvrability of the tractor-implement team. If full-area reconsolidation is done without for cultivation considerations, the transport chassis can take over the task of the reconsolidation device wholly or over a part area for example by serving as an actuator for controlling the contact pressure of the depth guide device.

In an extended form of the invention, the transport chassis is designed to be height-adjustable via adjusting devices together in sequential control with the adjusting devices for adjusting the height of the reconsolidation device. In this way, the contact pressure of the depth guide device and the lift of the chassis can be overridden manually via an actuation device.

The invention refers in particular to a soil cultivation implement that is designed as a tined cultivator or short disc harrow. These implements in particular have a high traction requirement with an increasing working depth and need the advantages of a controlled depth guide.

The invention is characterised in particular in that with approximately uniform steady pressure on the reconsolidation unit a constant tractor-implement pull line is formed, which enables uniform traction behaviour of the towing tractor in that the contact pressure of the depth guide device on the ground is limited and controlled. Trouble-free deployment of traction enhancement to transfer the weight of the implement to the towing tractor is enabled, because the positioning elements are located at a distance from the traction enhancement system, so that a negative influence on the effect of the traction enhancement is not to be expected. The depth guide device carries out its work optimally with constant ground contact with controlled contact pressure in particular on uneven ground as well, and guarantees constant working results of the soil cultivation implement, without becoming overloaded. The constant working depth and reduction of the tractor slip reduce the drive energy requirement, and thus fuel consumption and $CO^2$-emissions, to a minimum.

BRIEF DESCRIPTION OF THE DRAWINGS

Further details and advantages of the object of the invention can be seen in the following description and the associated drawings, in which an example for carrying out the invention with the required details and individual parts is shown.

DETAILED DESCRIPTION

Figure 1:
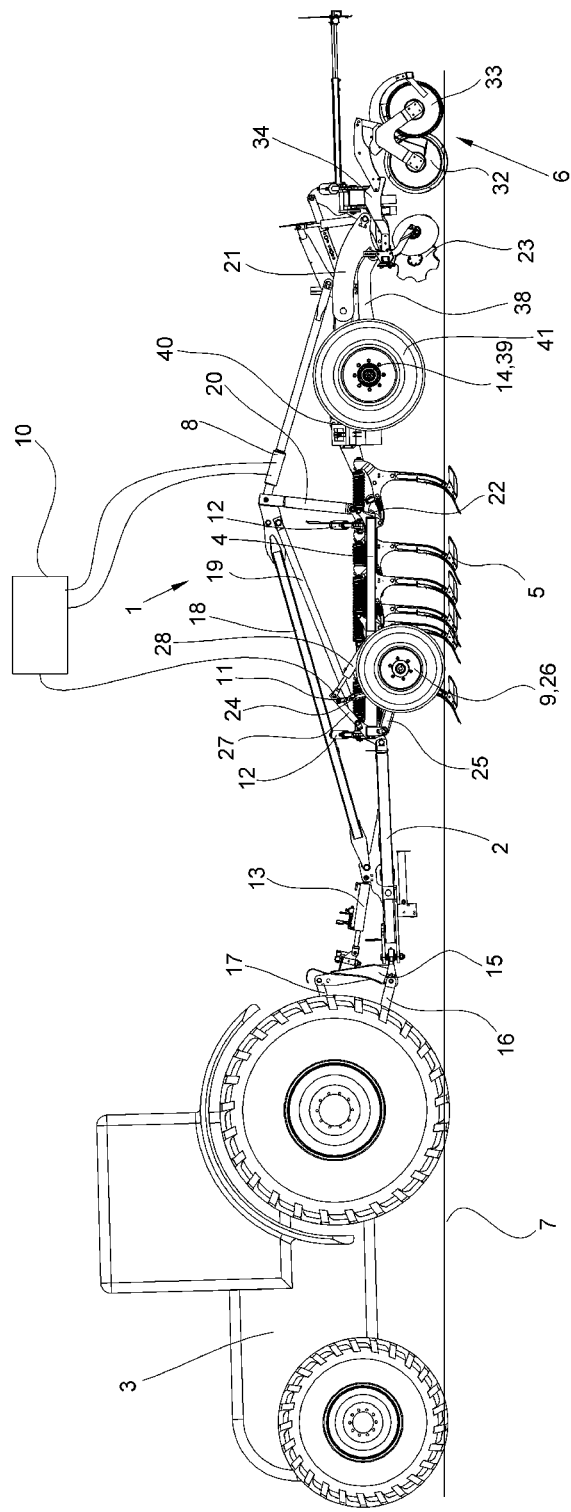
FIG. 1 Shows a side view of a team consisting of a tractor and a towed soil cultivation implement.

FIG. 1 shows a side view of a towed soil cultivation implement 1. This is connected to the three-point hydraulic system of the towing tractors 3 via the draw gear 2 and a mounting frame 15 with upper and lower links 16, 17. The three-point hydraulic system can raise the soil cultivation implement 1 in the front. In addition, the tractor 3 provides the hydraulic or electrical energy supply for the soil cultivation implement 1 and the controller 10 through lines that are not shown further. The controller 10 is designed here as a mobile controller that evaluates and calculates the values from the measuring instruments 11 and transducers, and forwards the necessary corrective signals to the actuators or adjusting device 8. The corrective signals can be transmitted to the adjusting device 8 directly or by switchgear units such as electrical power switches or hydraulic or pneumatic valves that are not shown further here. At the same time, additional adjusting devices 12, 13, 28, 36, 40 can be activated in parallel. The controller 10 can be connected on the implement or the tractor 3 with a display or control unit that is not shown here. The draw gear 2 is mounted flexibly to the mounting frame 15 in several degrees of freedom, in order to compensate for pitching, rolling and steering movements between tractor 3 and soil cultivation implement 1. Above the draw gear 2, an adjusting device 13 is located flexibly as a hydraulic cylinder between the draw gear 2 and the mounting frame 15, in order to enable weight displacement from the implement or tractor front axle to the tractor rear axle in the function of a traction enhancer. The draw gear 2 is on the one hand fastened to frame 4 and is supported via a strut 18 against a tower 20 that is also fastened to frame 4, and is braced against frame 4 by several struts 19. Soil tillage tools 5, 5', 5" in the form of overload protected wing share tines spaced apart from each lengthwise and crosswise are fastened to frame 4 in transverse rows. Seen from above, the imaginary boundary of this layout pattern of the soil tillage tools 5 is formed approximately by a trapezoidal shape that widens to the rear. Depth guide devices 9 are attached vertically adjustable to the frame 4 at the side. The depth guide device 9 consists of a support wheel 26, which pivots on a swivelling arm 25. The latter pivots vertically on frame 4 and is supported by means of a turnbuckle 24 against a plate 27 that is supported against the frame 4 by means of a lengthways adjustable adjusting device 28 in the form of a hydraulic cylinder. A measuring instrument 11 in the form of a loadpin, which connects the plate 27 to the turnbuckle 24, determines the contact pressure or the load pressure of the depth guide device 9 on the ground 7. A pressure sensor in the hydraulic line that supplies the adjusting device 28 can also be used to determine the contact pressure of the depth guide device 9. Side skids or other depth guide devices are also conceivable instead of the support wheel 26.

Behind the frame 4 an additional frame 21 that supports the reconsolidation unit 6 is attached vertically pivotable via joint 22. An additional adjusting device 8 in the form of an extended hydraulic cylinder is attached between the frame 21 and the tower 20 at a distance from the joints 22. Through a length adjustment of this adjusting device 8 by the controller 10, the frame 21 pivots with the reconsolidation unit 6 around the axis of the joints 22 and enables an adjustment of the height of the reconsolidation unit 6 relative to the soil tillage tools 5, 5', 5". If the measured contact pressure of the depth guide device 9 on the ground 7 increases, for example when driving over uneven ground, the controller 10 gives the adjusting device 8 a signal to extend further until the targeted contact pressure of the depth guide device 9 is reached. If the measured contact pressure falls, the controller 10 acts conversely and sends the adjusting device 8 a signal to retract again, until the targeted contact pressure of the depth guide device 9 on the ground 7 is reached. In this way, constant contact and contact pressure of the depth guide device 9 to the ground 7 is guaranteed and consequently the desired working depth of the soil tillage tools 5, 5', 5" is maintained even when moving over uneven and hilly ground. At the same time, the load on the reconsolidation unit 6 remains practically constant and the pull line between the mounting frame 15 and the soil tillage tools 5, 5', 5" is maintained in an ideal direction. A set of levelling tools 23 in the form of angled, rotatable hollow discs that levels the banks of loose soil that is thrown up by the last row of soil tillage tools 5" is positioned in advance of the reconsolidation unit 6. In addition, a vertically pivotable transport chassis 14 is attached hinged to the frame 21 that usually consists of a chassis frame 38, a running axle 39 and running wheels 41 and couples the soil cultivation implement 1 for transport and turning with adjusting devices 40 in the form of hydraulic cylinders. The hydraulic cylinders are supplied with pressure oil from the tractor. During tilling, the transport chassis 14 is raised above the surface of the ground 7, as shown.

Figure 2:
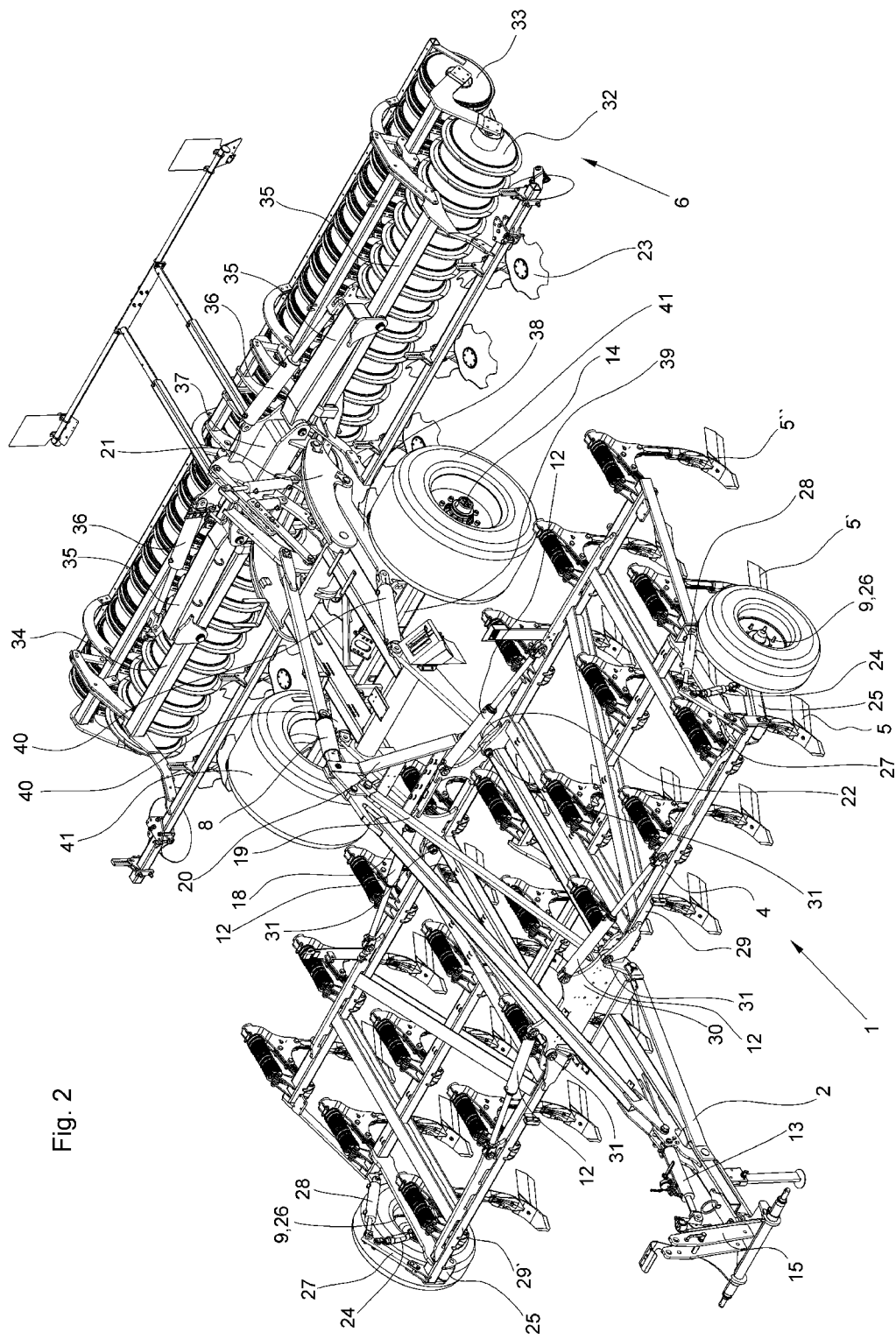
FIG. 2 Perspective view of a towed soil cultivation implement.

FIG. 2 shows a perspective view of the same implement. The frame 4 formed from a middle part 30 and two side parts 29, 29' connected pivotable to it. Four adjusting devices 12 open the side parts 29, 29' from a vertical, narrow transport position to a horizontal working position, as shown. Because of the lever action of the adjusting devices 12 respectively around the joints 31 and of the depth guide devices 9 that are spaced apart at the sides from the joints 31, the actuating forces of the adjusting devices 12 can be fixed with load pins or pressure measuring devices, and in this way the contact pressure of the depth guide devices 9 on the ground 7 fixed and controlled through the controller 10. In the same way as the front frame 4, the rear reconsolidation device 6 is designed to be foldable for conversion from the transport to the working position. The reconsolidation device 6 consists of a front and rear pair of rollers 32, 33, whereby each roller stretches over half of the width of the machine. The rollers 32, 33 are each pivotable in a roller frame 34. The roller frame 34 itself is mounted on a swivelling arm 35 on pendulum bearings that can swivel via the adjusting devices 36 from the working to the transport position. The layout is symmetrically identical here. The adjusting devices 36 and the swivelling arms 35 are mounted on a centre frame 37 that is attached to the frame 21. A single roller row as a side roller pair is possible as well, and the extremely different roller forms are also conceivable as tyre packers, which can also be used for the road transport of the implement. The reconsolidation device 6 compacts the loosened ground 7 over the full area, but reconsolidation in strips is conceivable as well. The reconsolidation device 6 is designed to be multiple movable in several degrees of freedom. However, only the vertical adjustability or the height adjustment of the reconsolidation device 6 relative to the soil tillage tools 5, 5', 5" is decisive for the function of the controller.

The invention claimed is:

1. Towed soil cultivation implement (1) comprising a draw gear (2) for suspending on a tractor (3) and a frame (4) connected to the draw gear (2), the frame including a front section proximal the tractor, a middle section and a rear section distal from the tractor having transport wheels, soil tillage tools (5) connected in a front section of the frame (4) for tilling and loosening a ground (7), levelling tools (23) coupled to the front section of the frame downstream from the soil tillage tools, a reconsolidation device (6) comprising at least one roller for reconsolidation and re-compaction of the loosened ground (7) disposed on the rear section of the frame downstream from the soil tillage tools (5), the levelling tools (23) and the transport wheels, wherein the reconsolidation device (6) is adjustable in a height setting with respect to the soil tillage tools (5) through an external power with at least one adjusting device (8), at least one depth guide device (9) arranged adjacent to the front section by the soil tillage tools (5), wherein the at least one adjusting device (8) for adjusting the height setting of the reconsolidation device (6) is coupled to a controller (10) for controlling a contact pressure of the at least one depth guide device (9) on the loosened ground (7) wherein responsive to an increase or a decrease in the contact pressure of the depth guide device (9), the height setting of the reconsolidation device (6) is readjusted by the controller (10) through the at least one adjusting device (8).

2. Towed soil cultivation implement in accordance with claim 1, wherein a minimum distance between the depth guide device (9) and one of the soil tillage tools (5) is less than a minimum distance between the front section of the soil tillage tools (5) and the reconsolidation device (6).

3. Towed soil cultivation implement in accordance with claim 1, wherein the contact pressure of the depth guide device (9) on the ground (7) can be selected and adjusted as a control variable in steps or continuously.

4. Towed soil cultivation implement in accordance with claim 1, wherein the contact pressure of the depth guide device (9) on the ground (7) is measured with measuring instruments (11) on the depth guide device (9).

5. Towed soil cultivation implement in accordance with claim 1, wherein actuating forces of the at least one adjusting device (8) for adjusting the height of the reconsolidation device (6) are recorded by the controller (10) and used to regulate the contact pressure of the depth guide device (9).

6. Towed soil cultivation implement in accordance with claim 1, wherein additional adjusting devices (12) for setting the frame (4) in a working position are provided whose actuating forces are indicative of the contact pressure of the depth guide device (9) and are included to regulate the contact pressure through the controller (10).

7. Towed soil cultivation implement in accordance with claim 1, wherein the controller (10) is a three-point controller.

8. Towed soil cultivation implement in accordance with claim 1, wherein the controller (10) is designed to operate on the control or positioning elements of the tractor (3).

9. Towed soil cultivation implement in accordance with claim 1, wherein the depth guide devices (9) are arranged laterally to the front section by the soil tillage tools (5).

10. Towed soil cultivation implement in accordance with claim 1, wherein the front section comprising the soil tillage tools (5) forms a trapezoidal distribution of the soil tillage tools (5) at least in front rows.

11. Towed soil cultivation implement in accordance with claim 1, wherein at least one additional adjusting device (13) is attached to the draw gear (2) that is designed to transfer part of a weight of the soil cultivation implement (1) to the tractor (3).

12. Towed soil cultivation implement in accordance with claim 1, wherein the soil cultivation implement (1) is attached to a height-adjustable transport chassis (14).

13. Towed soil cultivation implement in accordance with claim 1, wherein the transport chassis (14) is designed to be height-adjustable via adjusting devices (40) for adjusting the height of the reconsolidation device (6) together in a sequence control with the at least one adjusting device (8).

14. Towed soil cultivation implement in accordance with claim 1, wherein the soil tillage tools are selected from tined cultivators, short disc harrows, and combinations thereof.

* * * * *